Patented June 3, 1952

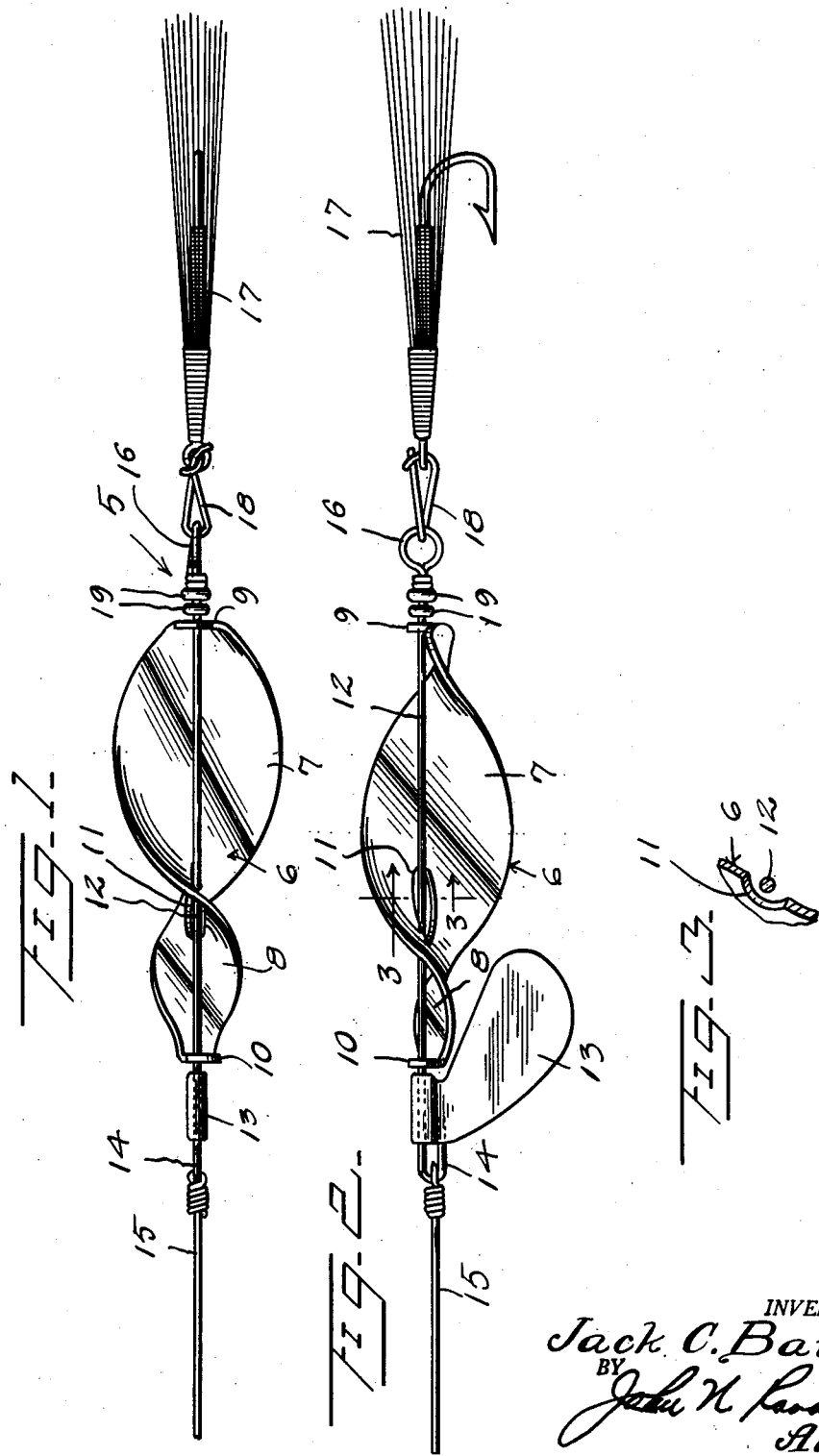

2,598,965

UNITED STATES PATENT OFFICE 2,598,965

FISH LURE

Jack C. Bain, Santa Fe, N. Mex.

Application April 16, 1948, Serial No. 21,348

1 Claim. (Cl. 43—42.2)

This invention relates to an improved construction of fish lure of the revolving type including an elongated, twisted lure body which is adapted to revolve when drawn through the water for producing a plurality of light reflections at each revolution for attracting game fish thereto.

More particularly, it is an object of the present invention to provide an improved construction of trolling or casting lure of the aforedescribed type having means whereby the revolving spinner body of the lure can rotate freely relatively to a trolling or retrieving line attached to the lure and an artificial or natural bait, forming a part of the lure.

Another object of the invention is to provide a spinner type lure including a shaft for journaling the spinner body and provided with means to prevent rotation of the shaft with the spinner.

Various other objects and advantages of the invention will hereinafter become more fully apparent from the following description of the drawing, illustrating a presently preferred embodiment thereof, and wherein:

Figure 1 is a top plan view of the improved lure;

Figure 2 is a side elevational view thereof; and

Figure 3 is a fragmentary cross sectional view taken substantially along a plane as indicated by the line 3—3 of Figure 2.

Referring more specifically to the drawing, the improved fishing lure in its entirety is designated generally 5 and includes a spinning lure body, designated generally 6 which is twisted longitudinally substantially about its longitudinal axis. The lure body 6 is tapered toward each end thereof and is provided with a rear end portion 7 which is larger than the forward or leading end portion 8 thereof. The spinner 6 is provided with substantially right angularly turned corresponding end portions 9 and 10 located at the rear and forward ends thereof, respectively, and which portions 9 and 10 are disposed substantially at right angles to the axis of the spinner 6. The portions 9 and 10 form eyes, the apertures of which, not shown, align with an elongated, longitudinally disposed opening 11 of the spinner body which is disposed between the enlarged portion 7 and restricted portion 8 thereof and where a twist of said body crosses the axis of the eyes 9 and 10.

The spinner 6 is journaled on a shaft 12 which extends loosely through the eyes 9 and 10 and the opening 11 and which forms a journal for said eyes 9 and 10 and accordingly for the spinner body 6. The forward end of the shaft 12 is provided with a turned back portion which extends into the body of a keel or fin 13 which is also secured to the shaft 12, forwardly of the leading eye 10 so that said keel or fin 13 is fixedly disposed with respect to the shaft 12. The keel or fin 13 which is substantially flat extends outwardly and rearwardly with respect to the shaft 12 and has a portion thereof disposed outwardly of the forward end portion 8 of the spinner 6 and which is relatively wide and substantially flat and with its plane disposed axially of the shaft. Accordingly, the turned back forward end of the shaft 12 forms a loop or eye 14 to which an end of a trolling or retrieving line 15 is adapted to be secured. The opposite, trailing end of the shaft 12 is turned back upon itself and twisted to form an eye or loop 16. An artificial lure such as a "bug" 17 is adapted to be attached to the eye 16 by a snap hook 18. One or a plurality of beads 19 is rotatably disposed on the shaft 12 between the twisted shank of the eye 16 and the rear or trailing eye 9 of the spinner 6 to provide a thrust bearing means to prevent binding engagement of the eye 9 with the twisted shank of the eye 16 and which would retard the rotation of the spinner 6 as the lure 5 is drawn through the water in a direction from right to left of Figures 1 and 2.

The spinner body 6 may be formed of any suitable material either buoyant or non-buoyant and with the surfaces thereof preferably polished to reflect light and of various colors, if desired. The keel or fin 13 may likewise be formed of a buoyant or non-buoyant material and may be of various sizes and when formed of a non-buoyant material of sufficient weight will function as a sinker to cause the lure 5 to be deep running. Any desired type of natural or artificial bait may be substituted for the "bug" 17.

It will be readily apparent that when the lure 5 is drawn through the water from right to left of Figures 1 and 2 that the spinner 6 will be caused to revolve by the pressure of the water thereagainst in a clockwise direction looking from front to rear or from left to right of the lure 5. The fish or keel 13 will prevent the shaft 12 from revolving with the spinner 6 due to the frictional contact of the eyes 9 and 10 therewith and when formed of a relatively light weight or buoyant material will assume a position opposite to that shown in Figure 2 or above the shaft 12 when drawn through the water. When the fin or keel 13 is heavier for weighting the lure 5, it will assume a depending position as illustrated in Figure 2 and will likewise function to prevent rotation of the shaft 12 with the spinner 6. For varying the depth at which the lure 5 will move through the water, the spinner 6 can be reversed end-for-end on the shaft 12, as by untwisting the bight of the eye 16, so that its enlarged portion 7 will constitute the leading end thereof and if desired the shaft 12 may be elongated and two or more spinners 6 may be employed, twisted in the same or opposite directions for causing the spinners when arranged in tandem to revolve in the same or in opposite directions, respectively, as the lure 5 is trolled or retrieved.

Various other modifications and changes are likewise contemplated and may obviously be resorted to, without departing from the spirit or scope of the invention as hereinafter defined by the appended claim.

I claim as my invention:

An artificial lure comprising an elongated shaft, and a spinner body journaled at its ends on said shaft parallel to its longitudinal axis, said spinner body being spirally twisted on its longitudinal axis and throughout its length, said shaft having a forward end adapted to be connected to a trolling or retrieving line for drawing the lure through the water to cause rotation of the spinner body about said shaft, and a keel member fixed at one end thereof to the shaft and projecting outwardly and rearwardly therefrom, said keel member being disposed in a plane radially of the shaft, and a forward end portion of the spinner body being disposed between the shaft and keel member.

JACK C. BAIN.

REFERENCES CITED

The following references are of record in the file of this patent:

UNITED STATES PATENTS

| Number | Name | Date |
|---|---|---|
| 849,036 | Zimmerman | Apr. 2, 1907 |
| 1,627,637 | Dahlquist | May 10, 1927 |
| 1,967,089 | Hick | July 17, 1934 |
| 2,086,008 | Turner | July 6, 1937 |
| 2,123,150 | Larson | July 5, 1938 |

FOREIGN PATENTS

| Number | Country | Date |
|---|---|---|
| 318,340 | France | of 1902 |